Aug. 28, 1956
C. E. COMPTON
2,760,255
SCREW CONVEYOR AND MANUFACTURE THEREOF
Filed May 26, 1951
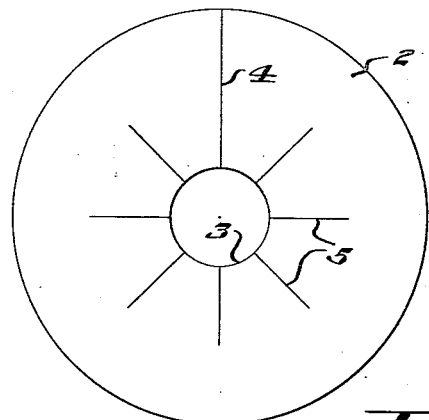
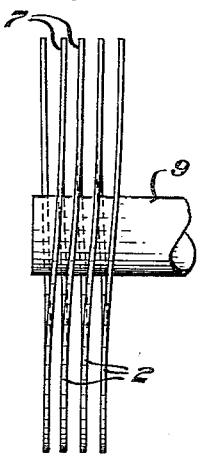
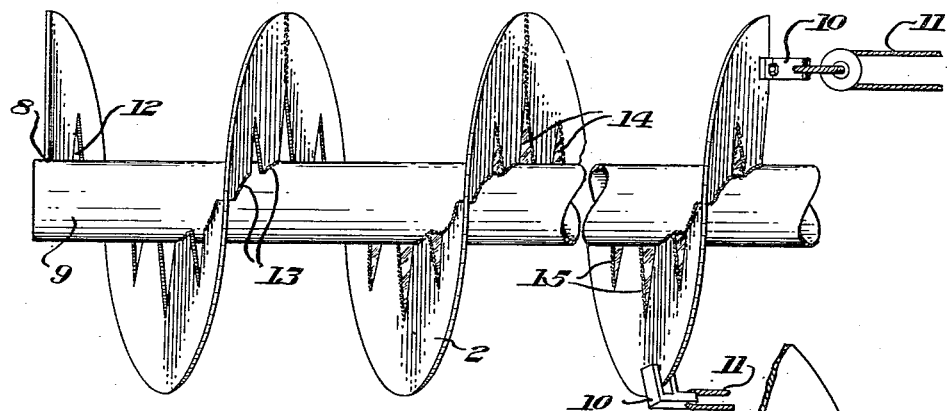
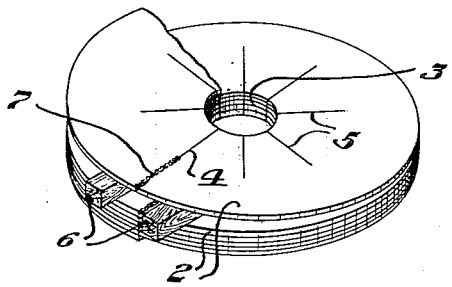
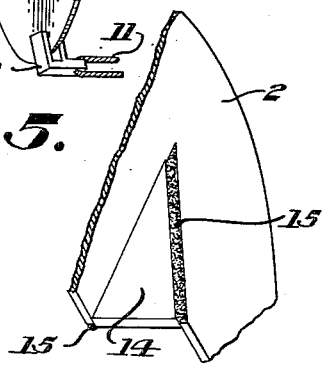
INVENTOR
CHARLES E. COMPTON United States Patent Office 2,760,255
Patented Aug. 28, 1956

2,760,255
SCREW CONVEYOR AND MANUFACTURE THEREOF

Charles E. Compton, Shinnston, W. Va.

Application May 26, 1951, Serial No. 228,397

10 Claims. (Cl. 29—156.8)

This invention relates to a screw conveyor and the manufacture thereof. It relates particularly to a screw conveyor of the type employing a helically arranged generally plate-like member which when rotated advances material disposed between its convolutions and the manufacture of such a conveyor.

Prior to my invention it was known to those skilled in the art to make a screw conveyor of the type above mentioned by providing a series of discs each having a hole through the center thereof, slitting each disc from the central hole completely to its periphery, welding together the slit discs at the edges of the slits to form in effect a continuous helix with the convolutions thereof lying in contact with each other, disposing the continuous helix over a central shaft and progressively along the shaft pulling out the continuous helix to separate the convolutions thereof and welding the helix to the shaft.

The method above described was highly objectionable and the conveyor produced was not fully satisfactory. In pulling out the helix over the shaft great effort was required and the material of the helix was undesirably stressed and deformed. The helix was undesirably cupped in the radial direction and the material thereof had to be so greatly stressed that at times it was materially thinned due to the stress if it did not actually crack or rupture. The stressing of the material of the helix resulted in undesirable weakness and possible failure of the conveyor. The cost of manufacture was very high as relatively heavy duty equipment had to be employed to pull the helix out and a relatively great number of workmen had to be used to operate the equipment and perform the various operations. Altogether the conveyor was an unsatisfactory high cost product having an indeterminate life due to the great stresses imparted in its manufacture.

I have devised a conveyor of the general type above referred to and a method of making such a conveyor obviating all of the disadvantages heretofore existing. I provide a conveyor which may be very easily manufactured without the employment of the relatively heavy duty equipment heretofore needed to pull out the helix and which can be fabricated by a smaller number of workmen in a shorter time and at greatly reduced cost. The conveyor itself is superior in being comparatively free from stresses which may result in failure in use. The helix is not undesirably cupped and the metal is not thinned in places as has heretofore been the case. Also, for reasons which will be explained, my improved conveyor in at least one form which it may assume has important advantages in use through increased conveying efficiency.

In making a screw conveyor of the general type above referred to I may provide a disc having a hole through the center thereof and provide in the disc a plurality of slits extending outwardly from the central hole, one of the slits extending completely to the periphery of the disc, other of the slits extending only part way to the periphery of the disc. The slits are preferably, though not necessarily, radial. I may dispose the disc about a central shaft and separate generally parallel to the axis of the shaft the edges of the slit extending completely to the periphery of the disc and fasten the thus disposed disc to the shaft to form a screw conveyor. While I prefer to employ a central shaft the screw may be maintained with its convolutions separated by other means. However, for purposes of explanation and illustration I shall describe the making of a screw conveyor by disposing the screw or helical element about a central shaft.

The provision of the slits extending only part way to the periphery of the disc facilitates the pulling out of the helix in the axial direction, and when a central shaft is used the helix may be disposed over the shaft and one end thereof may be fastened to the shaft, as, for example, by tack-welding, and the other end may be pulled axially of the shaft whereby with the employment of a minimum of force the entire helix, even though it may be thirty feet to fifty feet or more in length when extended, may be pulled out in a single operation so as to be ready for fastening to the shaft. The fastening is desirably effected by welding. The welding can be carried on in a rapid and continuous manner along the helix and need not be discontinued intermittently as was previously necessary to enable the procurement of a new "hitch" on the helix to pull out another short length of it. The partial slits relieve the material of the helix of the greater part of the stress to which the material of the helix has been subjected in the prior practice. When the helix is pulled out the partial slits open up, forming, when the slits are radial, substantially triangular shaped openings with their bases against the surface of the shaft and their apices disposed outwardly therefrom. The openings are generally, although not precisely, in longitudinal planes. The result is a conveyor which can be produced at unprecedentedly low cost yet which at the same time is unprecedentedly strong, relatively free from stresses and strains and relatively unlikely to fail during use.

In the finished conveyor the openings formed by the partial slits may be left open if desired or they may be closed by applying means thereto to close the same. I prefer to close the open slits. I prefer to apply thereto plates of appropriate, e. g., generally triangular, shape so as to substantially fill the openings and weld the plates to the slit edges. The plates may also if desired be welded to the central shaft if a central shaft is employed. In any event the helical element is itself preferably welded to the central shaft when a central shaft is employed.

The conveyor will operate satisfactorily and efficiently without application of closure means to the open slits but it is desirable to apply closure means, first, for the reinforcing effect obtained thereby, second, because the closure means avoid the passage of material through the slits which somewhat reduces the conveying efficiency of the conveyor and, third, because the closure means lie in generally longitudinal planes and upon turning of the conveyor bear rather directly in a circumferential direction against the material being conveyed. This is very helpful in case the material tends to jam or clog. The closure members which are disposed generally in planes containing the axis of the shaft positively force portions of the material being conveyed upwardly and out of the general body of that material, thereby affording a somewhat loosening effect promoting rapid and efficient conveying.

It is, of course, possible to make a short conveyor using one disc only but normally a plurality of discs will be employed which will be welded together at at least portions of their slit edges. I find it desirable when welding together a plurality of discs to effect the welds at the outer portions only of the slit edges which are being welded together, to wit, the edges of the slits which extend from the central holes completely to the peripheries of the discs, leaving unwelded slits at the inner portions of those edges. Desirably the unwelded slits thus left at the inner portions of the edges which are welded together may have approximately the same radial dimension as the partial slits and in the finished conveyor will be indistinguishable in function therefrom.

Other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same, in which:

Figure 1 is a plan view of a slit disc;

Figure 2 is an edge view showing a plurality of discs such as that shown in Figure 1 welded together at portions of the slit edges and disposed about a shaft to which they are to be applied to form a screw conveyor;

Figure 3 illustrates a method of forming a screw conveyor and shows at respective portions thereof two forms which the conveyor may take;

Figure 4 is a perspective view showing how slit discs may be welded together; and Figure 5 is a fragmentary detail perspective view showing a triangular closure member welded into an open partial slit in the conveyor.

Referring now more particularly to the drawings, there is shown in Figure 1 in plan view a disc 2 which may, for example, be of steel and of suitable dimensions for forming a screw conveyor of desired size and capacity. A normal size of conveyor is from one foot to six feet in diameter and the thickness of the steel disc 2 should be in proper relation to the diameter of the disc and the work to be performed.

The disc 2 is provided with a circular central hole 3 and with eight radial slits equally spaced circumferentially of the disc one of which is designated 4 and the other seven of which are designated 5. The slit 4 extends completely from the central hole 3 to the periphery of the disc. The slits 5 extend only part way from the central hole 3 to the periphery of the disc. In the form shown the slits 5 extend approximately half way from the edge of the central hole to the periphery of the disc.

While as above stated the conveyor may be formed utilizing a single disc, since normally a plurality of discs will be utilized I shall describe the making of a conveyor utilizing a plurality of discs. The discs are welded to one another along portions of the edges formed by the slits 4 as clearly shown in the drawings. The welding may be accomplished by laying a disc upon a surface and raising one of the edges formed by the slit 4 and positioning one edge of another disc opposite the raised edge and welding the two edges together, preferably along only part of the opposed edges as above explained. Figure 4 shows how the opposed edges may conveniently be supported in position for welding by positioning bars or sticks of wood 6 so as to raise the unwelded edge of a lower disc and support an edge of an upper disc in proper relation thereto. The weld is designated by reference numeral 7 and may be formed by any appropriate method of welding. In the drawings each of the welds 7 is shown as extending inwardly from the periphery of the disc about half way to the edge of the central hole, thus leaving an unwelded slit in line with the weld which is of approximately the same radial extent as the slits 5.

When the desired number of discs have been welded together in the manner above described to form a helix they are disposed over a shaft as indicated more or less diagrammatically in Figure 2. The diameter of the shaft is less than the diameter of the hole in the helix before the helix is pulled out as pulling out of the helix results in decrease of the diameter of the hole therein. One end of the helix is tack-welded to the shaft as indicated at 8 in Figure 3. The other end the helix is engaged by any suitable means for pulling out the helix along the shaft. The shaft is designated 9 and the means for pulling out the helix along the shaft is shown as comprising a pair of elements 10 of any suitable form to engage the helix and means 11 for pulling the elements 10 generally axially of the shaft 9. Conventional block and tackle apparatus or any other suitable pulling means may be employed. The shaft 9 may be solid or hollow, being shown in the drawings as hollow and being constituted by a length of steel pipe.

Pulling out of the helix is facilitated by the above described slits. As the helix is pulled out the slits open up, forming generally triangular shaped openings 12 as shown in Figure 3. The provision of the openings relieves the heavy stresses which were imposed upon the material of the helix according to the prior practice and make it a simple matter without the use of heavy duty equipment to pull out the helix. The helix may be pulled out to its full length at one time which was virtually impossible with a long helix without the provision of the partial slits. The diameters of the central holes 3 in the discs are proportioned to the diameter of the shaft so that when the helix is pulled out to the desired pitch it will embrace the shaft. It is then preferably welded to the shaft as indicated at 13. By reason of the provision of the slits the generally radial elements of the helix are substantially perpendicular to the axis of the shaft. The helix is generally free from undesirable cupping although it may be very slightly and negligibly cupped since the metal adjacent the periphery of the helix is under some stress. However, that stress is minor and negligible in comparision with the heavy stress to which the helix was subjected according to the prior practice.

The slits may be left open in the finished conveyor as shown at the left-hand portion of Figure 3 or they may be closed by applying closure means thereto as shown at the right-hand portion of Figure 3. The closure means may take various forms but I prefer, when the slits in the discs are radial, to employ plates 14 of generally triangular shape welded to the edges of the open slits as shown at 15. When closure means such as the plates 14 are employed they lie in planes generally normal to the original planes of the discs as shown in Figure 4 and also generally in planes containing the axis of the shaft 9. As the conveyor rotates when in use the plates 14 serve to push rather directly transversely against portions of the material being conveyed whereby to force some of the material above the general level of the material in the conveyor and promote some looseness of the material whereby to prevent jamming or clogging. This results in optimum conveying efficiency.

The term "disc" as used herein includes not only a complete disc but also a sector of a disc, as my results would be obtainable by the use of sectors in the same manner as above described for use of complete discs.

While I have shown and described certain present preferred embodiments of the invention and have illustrated certain present preferred methods of practicing the same it is to be distinctly understood that the invention is not limited thereto but may be otherwise variously embodied and practiced within the scope of the following claims.

I claim:

1. A method of making a screw conveyor comprising providing a disc having a hole through the center thereof, providing a plurality of slits in the disc extending outwardly from the central hole, one of said slits extending completely to the periphery of the disc, other of said slits extending only part way to the periphery of the disc, disposing the disc about a central shaft, separating generally parallel to the axis of the shaft the edges of the slit extending completely to the periphery of the disc and fastening the thus disposed disc to the shaft to form a screw conveyor.

2. A method of making a screw conveyor comprising providing a disc having a hole through the center thereof, providing a plurality of slits in the disc extending outwardly from the central hole, one of said slits extending completely to the periphery of the disc, other of said slits extending ony part way to the periphery of the disc, disposing the disc with the edges of the slit extending completely to the periphery of the disc separated generally in a direction normal to the original plane of the disc and thereby opening up the slits extending only part way to the periphery of the disc and applying closure means to said opened slits.

3. A method of making a screw conveyor comprising providing a disc having a hole through the center thereof, providing a plurality of slits in the disc extending outwardly from the central hole, one of said slits extending completely to the periphery of the disc, other of said slits extending only part way to the periphery of the disc, disposing the disc with the edges of the slit extending completely to the periphery of the disc separated generally in a direction normal to the original plane of the disc and thereby opening up the slits extending only part way to the periphery of the disc and welding generally triangularly shaped closure members into the openings formed by opening up the slits.

4. A method of making a screw conveyor comprising providing a disc having a hole through the center thereof, providing a plurality of slits in the disc extending outwardly from the central hole, one of said slits extending completely to the periphery of the disc, other of said slits extending ony part way to the periphery of the disc, disposing the disc with the edges of the slit extending completely to the periphery of the disc separated generally in a direction normal to the original plane of the disc and thereby opening up the slits extending only part way to the periphery of the disc and welding generally triangularly shaped closure members into the openings formed by opening up the slits, the closure members extending in planes generally normal to the original plane of the disc.

5. A method of making a screw conveyor comprising providing a disc having a hole through the center thereof, providing a plurality of slits in the disc extending outwardly from the central hole, one of said slits extending completely to the periphery of the disc, other of said slits extending only part way to the periphery of the disc, disposing the disc about a central shaft with the edges of the slit extending completely to the periphery of the disc separated generally axially of the shaft and thereby opening up the slits extending only part way to the periphery of the disc, applying closure means to said opened slits and fastening the disc to the shaft to form a screw conveyor.

6. A method of making a screw conveyor comprising providing a plurality of discs each having a hole through the center thereof, providing a plurality of slits in each disc extending outwardly from the central hole, one of said slits in each disc extending completely to the periphery of the disc, other of said slits in each disc extending only part way to the periphery of the disc, connecting the discs together in generally side-by-side relationship by fastening together at least portions of edges of the respective slits extending completely to the peripheries thereof to form a helix, disposing the helix about a central shaft with the convolutions spaced apart and fastening the helix to the shaft to form a screw conveyor.

7. A method of making a screw conveyor comprising providing a plurality of discs each having a hole through the center thereof, providing a plurality of slits in each disc extending outwardly from the central hole, one of said slits in each disc extending completely to the periphery of the disc, other of said slits in each disc extending only part way to the periphery of the disc, connecting the discs together in generally side-by-side relationship by fastening together at their outer portions only edges of the respective slits extending completely to the peripheries thereof to form a helix with spaced inner slits extending only part way to the periphery thereof, said spaced inner slits including the inner portions of the slits which have their outer edge portions fastened together, disposing the helix about a central shaft with the convolutions spaced apart and fastening the helix to the shaft to form a screw conveyor.

8. A method of making a screw conveyor comprising providing a plurality of discs each having a hole through the center thereof, providing a plurality of slits in each disc extending outwardly from the central hole, one of said slits in each disc extending completely to the periphery of the disc, other of said slits in each disc extending only part way to the periphery of the disc, connecting the discs together in generally side-by-side relationship by fastening together at least portions of edges of the respective slits extending completely to the peripheries thereof to form a helix, disposing the helix with the convolutions spaced apart and thereby opening up the slits extending only part way to the periphery of the helix and applying closure means to said opened slits.

9. A method of making a screw conveyor comprising providing a plurality of discs each having a hole through the center thereof, providing a plurality of slits in each disc extending outwardly from the central hole, one of said slits in each disc extending completely to the periphery of the disc, other of said slits in each disc extending only part way to the periphery of the disc, connecting the discs together in generally side-by-side relationship by fastening together at least portions of edges of the respective slits extending completely to the peripheries thereof to form a helix, disposing the helix about a central shaft, fastening the helix to the shaft adjacent one end of the helix, pulling the other end of the helix along the shaft away from the first mentioned end of the helix to dispose the helix about the shaft with the convolutions spaced apart and additionally fastening the helix to the shaft to maintain the helix in substantially fixed relation to the shaft and form a screw conveyor.

10. A method of making a screw conveyor comprising providing a plurality of discs each having a hole through the center thereof, providing a plurality of slits in each disc extending outwardly from the central hole, one of said slits in each disc extending completely to the periphery of the disc, other of said slits in each disc extending only part way to the periphery of the disc, connecting the discs together in generally side-by-side relationship by welding together at least portions of edges of the respective slits extending completely to the peripheries thereof to form a helix, disposing the helix about a central shaft, welding the helix to the shaft adjacent one end of the helix, pulling the other end of the helix along the shaft away from the first mentioned end of the helix to dispose the helix about the shaft with the convolutions spaced apart and thereby opening up the slits extending only part way to the periphery of the helix and welding closure means to said opened slits and additionally welding the helix to the shaft to maintain the helix in substantially fixed relation to the shaft and form a screw conveyor.

References Cited in the file of this patent

UNITED STATES PATENTS

| | | |
|---|---|---|
| 234,868 | Hawkins | Nov. 30, 1880 |
| 368,569 | Caldwell | Aug. 23, 1887 |
| 1,422,972 | Henry | July 18, 1922 |
| 1,738,994 | Gredell | Dec. 10, 1929 |
| 2,038,670 | Noack | Apr. 28, 1936 |
| 2,046,988 | Winter | July 7, 1936 |
| 2,251,074 | Sibley | July 29, 1941 |
| 2,437,259 | Kautz | Mar. 9, 1948 |
| 2,440,698 | Patterson | May 4, 1948 |
| 2,496,764 | Whitney | Feb. 7, 1950 |
| 2,528,679 | Ballard et al. | Nov. 7, 1950 |
| 2,542,913 | Ensign | Feb. 20, 1951 |

FOREIGN PATENTS

| | | |
|---|---|---|
| 252,568 | Germany | Oct. 23, 1912 |
| 392,346 | Germany | Mar. 24, 1924 |